Jan. 28, 1936.  A. B. CHURCH  2,029,157

MOTOR DRIVEN BEATER

Filed Feb. 6, 1931

Inventor:
Arthur B. Church
By George Heidman
Atty.

Patented Jan. 28, 1936

2,029,157

UNITED STATES PATENT OFFICE 2,029,157

MOTOR-DRIVEN BEATER

Arthur B. Church, Chicago, Ill., assignor, by mesne assignments, to Hamilton Beach Manufacturing Company, Racine, Wis., a corporation of Wisconsin Application February 6, 1931, Serial No. 513,815

10 Claims. (Cl. 259—131)

This invention relates to motor driven beaters, commonly called food mixers, adapted for beating eggs, whipping cream, mixing batters and the like.

One of the objects of the invention is to produce a compact, unitary structure which is portable and provided with rotatable beaters which are removable from the casing which encloses the motor gearing for driving the beaters in opposite directions. The beaters may be removed and cleansed without wetting the motor and gearing.

Other objects and advantages will appear from the following specification:

Referring to the drawing:—

Figure 1:
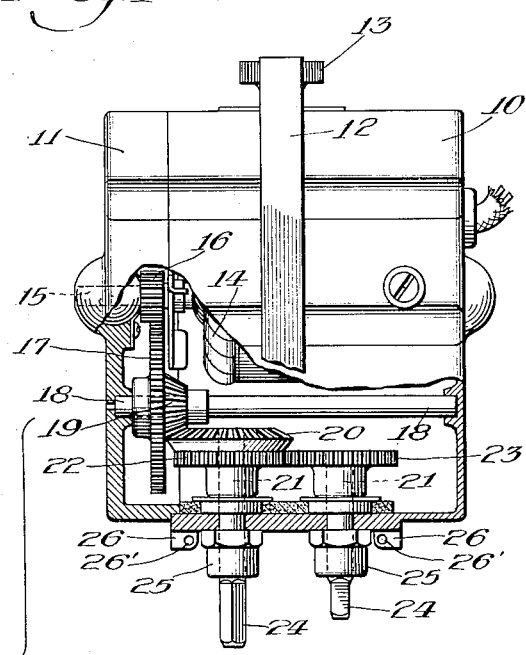
Fig. 1 is a side elevation of a motor driven beater embodying my invention, the beater unit being shown as detached from the motor casing; parts being broken away and shown in section.
Figure 1:
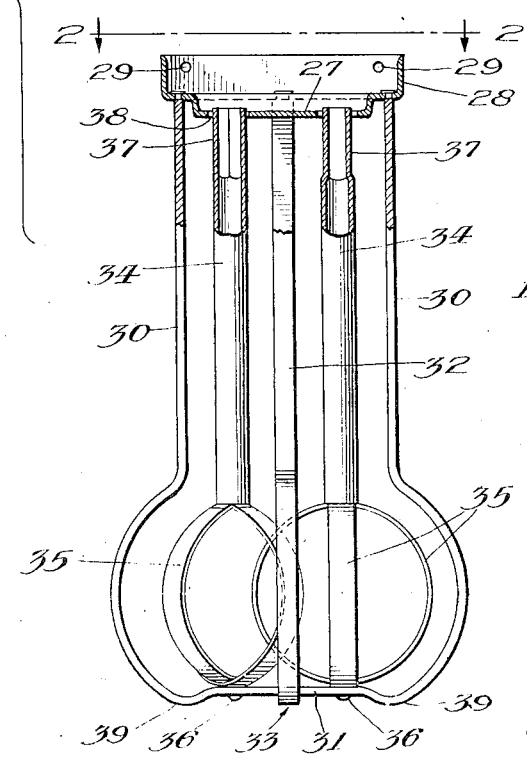

In that embodiment of the invention which I have shown in the drawing, the casing 10 is substantially rectangular in cross section and is provided at its open end with a closure plate 11. At each side there is fixed to the casing a handle 12. 13 indicates an adjusting knob for regulating the speed of the motor by means of a rheostat located in the upper part of the casing. The speed regulating means being no part of my invention, need not be further described. Within the casing is a motor 14 having a motor shaft 15 arranged horizontally, with its ends journaled in the casing members 10 and 11, respectively.

Fixed on the motor shaft 15 is a pinion 16 adapted to mesh with the gear 17 which is rotatably mounted on a non-rotatable shaft 18, journaled in the casing members 10, 11, below the motor 14. Integral with the gear 17 is a bevel gear 19 adapted to engage the bevel gear 20 which is fixedly mounted on the upper end of one of a pair of rotatable shafts 21. The bevel gear 20 is integral with a gear 22 adapted to mesh with a similar gear 23 fixed to the upper end of the other rotatable shaft 21. Each of the shafts 21 extends downwardly through an aperture in the lower wall of the casing 10 and terminates in a square end 24. The shafts 21 are preferably journaled in bearings 25 which may be fixed to or integral with the lower wall of the casing 10. Lugs 26 bored horizontally as indicated at 26', secured to or integral with the lower wall of the casing, are located adjacent the bearings 25.

Figure 2:
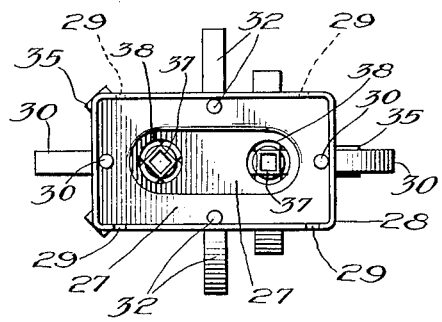
Fig. 2 is a plan view of the beater unit when detached, taken on the line 2—2 of Fig. 1.
Figure 3:
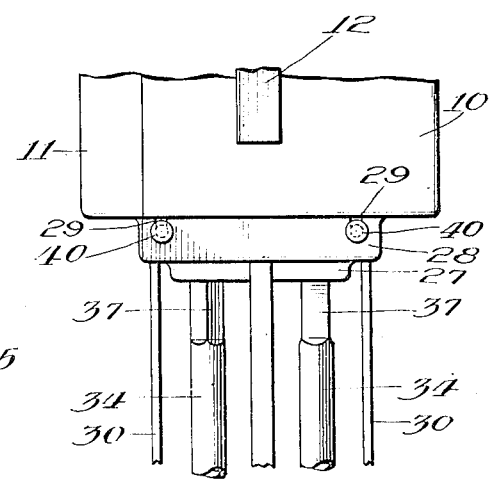
Fig. 3 is a fragmentary side elevation showing the beater unit attached to the casing.

The removable beater unit comprises a dished plate 27 provided with an upright marginal flange 28 apertured at 29 to register with the bores 26' extending through the lugs 26. The guard or non-rotatable support for the beaters comprises two pieces of metal, one forming the uprights 30 and cross bar 31 and the other forming the uprights 32 and cross bar 33. The bar 31 crosses the bar 33 and is secured thereto. The upper ends of the upright members 30 and 32 are fixed in the plate 27 as best shown in Fig. 2.

Two rotatable beaters are mounted in the guard frame just described. Each comprises a shaft 34 carrying beater rings 35 at its lower end, and the beater rings 35 are rotatably secured to the cross bar 31 by rivets 36. At their upper ends 37 said rotatable shafts 34 are hollow and complemental to the ends 24 of the shafts 21. The ends 37 are loosely held in apertures 38 in the plate 27.

The shape of the cross bars 31 and 33 is such that they provide a four point support on which the mixer as a whole may stand, the supporting surfaces 39 being in a plane slightly below the plane of the major portion of the cross bars 31, 33, so that the base surfaces are not interfered with by the fastenings 36 intermediate the surfaces 39.

In order to attach the beater unit to the casing 10, 11, the ends 24 of the shafts 21 are inserted into the ends 37 of the shafts 34, to such an extent that the flange 28 of the plate 27 encloses the lugs 26 and bears against the under surface of the casing. Screws 40 may be inserted through the registering apertures 29 of the flange 28 and bores 26' of the lugs 26 to detachably mount the unit on the casing in fixed position, while permitting the shafts 34 to be rotated by the shafts 21.

Changes in details of construction may be made without departing from my invention.

I claim as my invention:—

1. A motor driven beater comprising a casing, a motor and motor shaft in the casing, a pair of rotatable shafts journaled in the casing and operatively connected to the motor shaft, a beater unit including a pair of rotatable beater shafts and a non-rotatable support, and means for detachably mounting said unit on the casing with the beater shafts in operative engagement with said rotatable shafts.

2. A motor driven beater comprising a casing, a motor and motor shaft in the casing, a pair of rotatable shafts journaled in the casing, operative connections between the motor shaft and said rotatable shafts for driving the latter in opposite directions, a beater unit including a pair of rotatable beaters and a non-rotatable support secured together, and means for detachably mounting said unit on the casing with the beater shafts in operative engagement with said rotatable shafts.

3. A motor driven beater comprising a casing, a motor and motor shaft in the casing, a pair of rotatable shafts journaled in the casing and operatively connected to the motor shaft, a beater unit including a pair of rotatable beaters, a non-rotatable support and a plate to which the upper ends of the support are connected and in which the beaters are rotatably mounted, and means for detachably securing the plate to the casing with the beater shafts in operative engagement with said rotatable shafts.

4. A motor driven beater comprising a casing, apertured lugs on the lower surface of the casing, a motor and motor shaft in the casing, a pair of rotatable shafts journaled in the casing and operatively connected to the motor shaft, a beater unit including a pair of rotatable beaters, a non-rotatable support, and a flanged plate secured to the upper ends of the support, and means for detachably securing the plate to the casing with the beater shafts in operative engagement with said rotatable shafts, said means comprising screws extending through said plate flange and apertured lugs.

5. A motor driven beater comprising a casing, a motor and motor shaft in the casing, a pair of rotatable shafts journaled in the casing and operatively connected to the motor shaft, a beater unit including a pair of rotatable beater shafts and a non-rotatable support, the support comprising upright members and cross bars secured together and adapted to stand in upright position on said cross bars, and means for detachably mounting said unit on the casing with the beater shafts in operative engagement with said rotatable shafts.

6. In a motor driven beater, the combination of a motor unit having a casing and a motor shaft, a pair of beater shafts journaled in said casing, operative mechanical connections in said casing for driving said beater shafts in opposite directions from said motor shaft, a pair of beaters actuated by said beater shafts, and a removable framework for supporting said beaters on said shafts.

7. In a motor driven beater, the combination of an electric motor unit having a casing and a motor shaft, a pair of beater shafts journaled in said casing, operative mechanical connections in said casing for driving said beater shafts in opposite directions from said motor shafts, a beater assembly removably mounted on said casing and comprising a pair of rotatable beaters, a non-rotatable guard, means for rotatably mounting said beaters on said guard to rotate with said shafts, and means for detachably securing said guard to said casing with said beaters in operative engagement with said shafts.

8. A motor driven beater comprising a motor, a gear casing fixedly secured to the motor, a pair of rotatable rods mounted in the gear casing and depending therefrom, a gear train directly connecting the rods with the motor shaft for rotation thereby in opposite directions, and beater elements quickly detachably mounted on said rotatable rods.

9. A motor driven beater comprising a casing, a motor having a horizontally disposed motor shaft mounted in the casing, a pair of vertical beater shafts rotatably journalled in the casing and operatively connected to the motor shaft for rotation in opposite directions, and interdigitating beater elements quickly detachably mounted on the beater shafts to rotate with said beater shafts.

10. A motor driven beater comprising a casing, a motor having a horizontally disposed motor shaft mounted in the casing, a pair of vertical beater shafts rotatably journalled in the casing a train of gears directly connecting said beater shafts with the motor shaft for rotation in opposite directions, said beater shafts depending a short distance below the casing, and interdigitating beater elements quickly detachably mounted on the beater shafts to rotate with said beater shafts.

ARTHUR B. CHURCH.